United States Patent

Katoh et al.

Patent Number: 5,131,728
Date of Patent: Jul. 21, 1992

[54] CRAWLER ASSEMBLY

[75] Inventors: Yusaku Katoh; Tsuyoshi Uchiyama, both of Fukuyama, Japan

[73] Assignees: Kabushiki Kaisha Komatsu Seisakusho; Fukuyama Gomu Kogyo Kabushiki Kaisha, both of Japan

[21] Appl. No.: 623,661

[22] PCT Filed: Jul. 13, 1989

[86] PCT No.: PCT/JP89/00705
§ 371 Date: Jan. 7, 1991
§ 102(e) Date: Jan. 7, 1991

[87] PCT Pub. No.: WO90/00488
PCT Pub. Date: Jan. 25, 1990

[30] Foreign Application Priority Data

Jul. 13, 1988 [JP] Japan .................... 63-093305[U]

[51] Int. Cl.⁵ .......................................... B62D 55/24
[52] U.S. Cl. ................................. 305/35 EB; 305/39
[58] Field of Search .................... 305/21, 23, 24, 28, 305/35 R, 35 EB, 38, 39, 56, 57

[56] References Cited

U.S. PATENT DOCUMENTS

| | | | |
|---|---|---|---|
| 4,904,030 | 2/1990 | Ono | 305/56 X |
| 4,948,201 | 8/1990 | Furuta | 305/39 X |

FOREIGN PATENT DOCUMENTS

| | | | |
|---|---|---|---|
| 0300488 | 1/1989 | European Pat. Off. | |
| 0030894 | 2/1989 | Japan | 305/35 EB |
| 0182182 | 7/1989 | Japan | 305/35 EB |
| 450820 | 7/1936 | United Kingdom | |

Primary Examiner—Russell D. Stormer
Attorney, Agent, or Firm—Ronald P. Kananen

[57] ABSTRACT

A crawler assembly aiming at preventing bogie wheels from detaching from a track, stabilizing the running of the bogie wheels and making it possible to use the crawler assembly for an endless rubber belt having core bars embedded therein and also for an endless iron caterpillar. The crawler assembly comprises a plurality of outer-flanged bogie wheels (3) each having flange portions (3b, 3b') formed on both outer sides of a central inner wheel portion so as to project radially; and an endless rubber belt 4' having core bars (10) embedded therein and which is wound round outside these outer-flanged bogie wheels, or an endless iron crawler track (1) provided with shoe links, and arrangement is made such that in the case of the rubber belt (4) the rolling surfaces of the flange portions of each of the outer-flanged bogie wheels are kept in contact with exposed stepped shoulder portions (13a, 13b, 13a', 13b') of the core bars (10), whilst in the case of the iron crawler track the rolling surfaces (3a) of the outer-flanged bogie wheels are kept in contact with the upper surfaces of the shoe links.

11 Claims, 13 Drawing Sheets

CRAWLER ASSEMBLY

TECHNICAL FIELD OF THE INVENTION

This invention relates to a crawler assembly, and more particularly to a rubber crawler assembly for use in earth moving machines or vehicles having endless rubber belts with core bars embedded therein.

BACKGROUND ART OF THE INVENTION

As the undercarriage of earth moving machines or vehicles, an iron crawler track 1 has mainly been used, and as means for running and turning such a track, center-flanged bogie wheels 2 as shown in FIG. 1A and outer-flanged bogie wheels 3 as shown in FIG. 1B are used.

In recent years, endless rubber belts 4 have come to be used partially. In combination with such rubber belts, center-flanged bogie wheels 2 as shown in FIG. 2A and outer-flanged bogie wheels 5 as shown in FIG. 2B are used. The center-flanged bogie wheels 2 as shown in FIG. 2A can be used for both iron crawler tracks and rubber belts, and therefore a large merit in terms of production cost reduction is obtained.

However, outer wheels 5a, 5a of the outer-flanged bogie wheels 5 as shown in FIG. 2B are not suitable for use with iron crawler tracks, and therefore combined use of them cannot be made. In FIGS. 2A and 2B, reference numeral 6 denotes a core bar, and 7 steel cords embedded in the rubber belt 4 so as to extend in the peripheral direction.

Hereupon, in case the rubber belts 4 are used in an earth moving vehicle, since the center-flanged bogie wheel (FIG. 2A) is kept in rolling contact with the top surfaces m of the central projections, vibration occurs on and along discontinuous surface between the adjoining bogie wheels, or when the rubber belt climbs over obstacles such as stone or the like such a phenomenon as inward bending of the belt occurs, and at that time the spacing between the central projections of adjoining core bars is widened thus causing a dropping of the bogie wheels therein, and when the bogie wheels come out again, the central projections are kicked hard by the bogie wheels thereby detaching the core bars themselves from the rubber belts 4, and hence impairing the durability thereof.

To prevent the occurrence of such a phenomenon, it is contemplated to form the central projections of the core bars in "T" shape and increase the length f of the central projections as shown in FIG. 12A. However, if the length f is increased, then since the inner peripheral surface of the crawler at places where it is wound around a sprocket 8, the adjoining central projections strike against each other as shown by "g". Therefore, the length f of the central projection cannot be increased beyond a certain limit so that there is a limit in measures for reducing vibration and preventing the rubber belts from bending inwardly.

In contrast thereto, the outer-flanged bogie wheels (FIG. 2B) are kept in rolling contact on the inner peripheral surfaces of the rubber belts, and so the rolling contact surfaces of the bogie wheels are continuous. Therefore, the aforementioned problem does not occur, and vibration of the rubber belts can be reduced considerably. However, the bogie wheels of this type cannot be used for iron crawler tracks, and also since the bogie wheels are kept in direct contact with the surfaces of the rubber belts, "pitting phenomenon" (like water-eczema) will occur on the surfaces of the rubber belts kept in contact with the bogie wheels, thereby impairing the durability of the rubber belts.

SUMMARY OF THE INVENTION

The present invention has been made in view of the above-mentioned circumstances in the prior art and has for its object to provide a rubber crawler assembly having core bars embedded therein which are capable of preventing bogie wheels from detaching from the endless track, stabilizing the rolling of the bogie wheels, reducing vibration of the endless track, and also improving the durability of the endless rubber belts themselves.

Another object of the present invention is to provide a crawler assembly which can be used for both rubber crawlers using endless rubber belts and endless iron crawler tracks.

A still further object of the present invention is to provide a crawler assembly which is capable of reducing considerably wear-down of the central projections of the core bars, thereby minimizing the lateral swing of the bogie wheels during running of the endless track, and hence preventing the bogie wheels from detaching from the endless track.

To achieve the above-mentioned objects, according to a first aspect of the present invention, there is provided a crawler assembly comprising: a plurality of outer-flanged bogie wheels each having flange portions formed on both outer sides of a central inner wheel portion thereof so as to project radially; and an endless rubber belt having core bar means embedded therein and which is wound round outside these outer-flanged bogie wheels, or an endless iron crawler track provided with shoe link means, wherein the arrangement is made such that in the case of the rubber belt the rolling surfaces of the flange portions of each of the outer-flanged bogie wheels are kept in contact with exposed stepped shoulder portions of the core bar means, whilst in the case of the iron crawler track the rolling surfaces of the central inner wheel portions of the outer-flanged bogie wheels are kept in contact with the upper surfaces of the shoe link means.

To achieve the above-mentioned objects, according to a second aspect of the present invention, there is provided a crawler assembly as set forth in the first aspect wherein the core bar means of the rubber belt is comprised of a plurality of core bar members embedded in the rubber belt at predetermined intervals with one another along the peripheral direction of the rubber belt and in such a manner that each of the core bars is partially exposed from the inner periphery of the rubber belt.

To achieve the above-mentioned objects, according to a third aspect of the present invention, there is provided a crawler assembly as set forth in the second aspect wherein parallel grooves are formed transversely widthwise between the mutually adjacent core bar members in the inner peripheral surface of the rubber belt.

To achieve the above-mentioned objects, according to a fourth aspect of the present invention, there is provided a crawler assembly as set forth in the second aspect wherein each of the core bar members comprises a pair of central projections standing upright in opposed relationship with each other on both sides of a central connecting portion, left-hand and right-hand horizontal portions projecting integrally from these central projections on the opposite sides of the central connecting portion, and stepped shoulder portions formed in parallel with each other in the boundaries between the left-hand and right-hand horizontal wing portions and the pair of central projections, respectively, the stepped shoulder portions projecting outwardly from the front and rear ends of each of the horizontal wing portions, the stepped shoulder portions each having a substantially flat surface somewhat higher in level than the upper surface of each of the left-hand and right-hand horizontal wing portions.

According to a fifth aspect of the present invention, there is provided a crawler assembly as set forth in the fourth aspect wherein each pair of stepped shoulder portions of the core bar member have a recess formed in the intermediate portion thereof and having a predetermined length.

According to a sixth aspect of the present invention, there is provided a crawler assembly as set forth in the fifth aspect, wherein the lengths of the upper surfaces of the front and rear stepped shoulder portions having the above-mentioned recess formed therebetween are different, and the arrangement of the upper surfaces of the front and rear stepped shoulder portions on the side of the left-hand horizontal wing portion is reverse to that of the upper surfaces of the front and rear stepped shoulder portions on the side of the right-hand horizontal wing portion.

According to a seventh aspect of the present invention, there is provided a crawler assembly as set forth in the sixth aspect wherein either one of the front and rear stepped shoulder portions on the side of the left-hand wing portion and the other one out of the front and rear stepped shoulder portions on the side of the right-hand horizontal wing portion are omitted.

According to an eighth aspect of the present invention, there is provided a crawler assembly as set forth in the fourth aspect wherein the pair of central projections of the core bar member are formed out of phase in front and rear about the central point of the core bar member, and also the stepped shoulder portions are formed only on either one of the front or rear side reverse to the biased side of each of the central projections.

According to a ninth aspect of the present invention, there is provided a crawler assembly as set forth in the fourth aspect wherein an intermediate stepped shoulder portion is formed integrally with the lower portion of the end face of each of the pair of central projections on the side of each of the stepped shoulder portions, each of the intermediate stepped portions having a height which is intermediate between the height of the top surface of each of the central projections and that of the upper surface of each of the stepped shoulder portions, the skirt portion of each of the intermediate stepped shoulder portions joining the upper surface of each of the stepped shoulder portions According to a tenth aspect of the present invention, there is provided a crawler assembly as set forth in the ninth aspect wherein each of the intermediate stepped shoulder portion is formed partially in the central zone of the end face of each of the central projections.

The above-mentioned and other objects, aspects and advantages of the present invention will become apparent to those skilled in the art by making reference to the following description and the accompanying drawings in which preferred embodiments incorporating the principles of the present invention are shown by way of example only.

BRIEF DESCRIPTION OF THE DRAWINGS

FIG. 5A is a schematic, transverse sectional view showing such a condition in the case of a rubber crawler assembly, while FIG. 5B is a schematic, longitudinal sectional view taken along line B—B; FIG. 5C is a schematic, transverse sectional view showing such a condition in the case of a crawler track made of iron;

FIG. 12A shows such a condition in the case of the prior art example, while FIG. 12B shows such a condition in the case of the embodiment of the present invention;

FIG. 13A shows such a condition in the case of the prior art example, while FIG. 13B shows such a condition in the case of the embodiment of the present invention;

DETAILED DESCRIPTION OF PREFERRED EMBODIMENTS

The present invention will now be described below in detail by way of several embodiments with reference to the accompanying drawings. (FIGS. 13 to 18)

FIRST EMBODIMENT

Figure 1A:
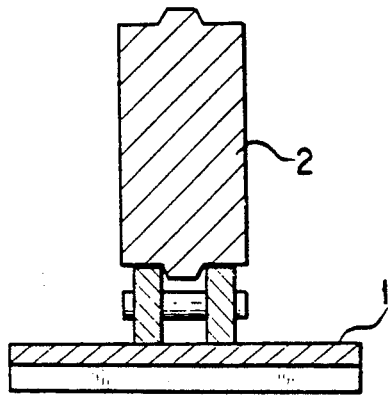
FIGS. 1A, 1B, 2A and 2B are schematic, transverse sectional views showing embodiments of prior art crawler assemblies, respectively.
Figure 1B:
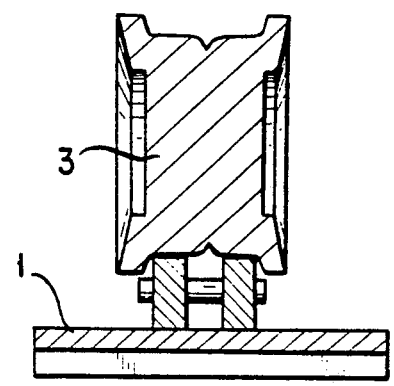
Figure 2A:
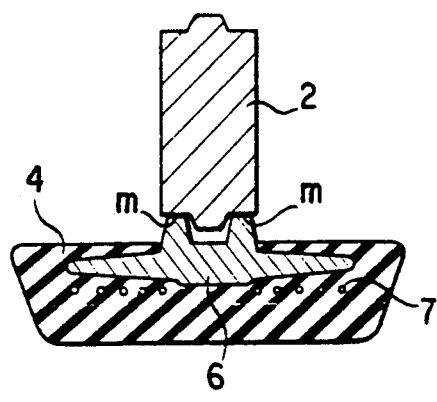
Figure 2B:
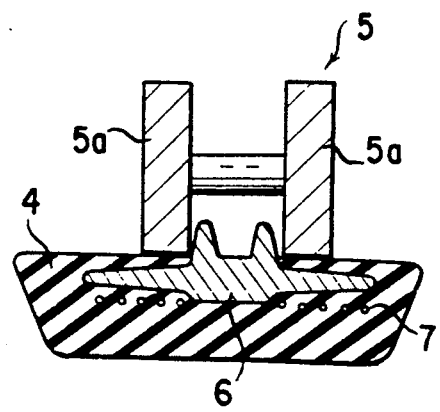
Figure 3:
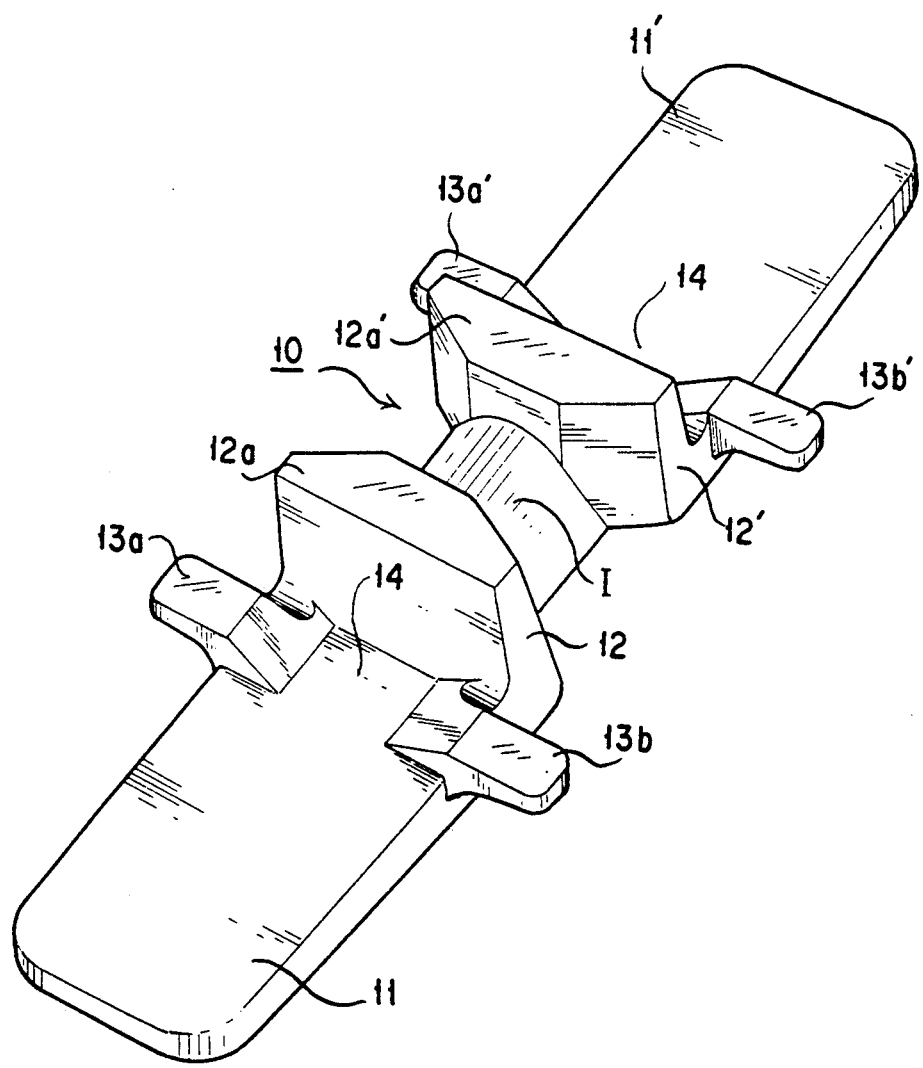
FIG. 3 is a schematic, perspective view of a core bar used in a crawler assembly of the present invention.

FIG. 3 shows a core bar 10 for use in a rubber crawler according to the present invention. Reference numerals 11 and 11' denote left-hand and right-hand wing portions, and 12 and 12' a pair of central projections which are formed upright in opposed relationship and at predetermined intervals in the central area of the core bar 10. The configuration of the core bar of the present invention is similar to those of the prior art examples. The core bar 10 has stepped shoulder portions 13a, 13b and 13a' and 13b' formed integrally therewith by projecting each of the front and rear edge portions in the boundary between the outer surfaces of the central projection 12 and 12' and the left-hand and right-hand wing portions 11 and 11', respectively, by a predetermined length in the widthwise direction of the wing portions in such a manner that the upper surfaces of the stepped shoulder portions 13a, 13b and 13a' and 13b' are generally flat and somewhat higher than the left-hand and right-hand wing portions 11, 11', and recesses 14 and 14' formed between the stepped shoulder portions 13a and 13b and 13a' and 13b', respectively, are lower than the upper surfaces.

Figure 4:
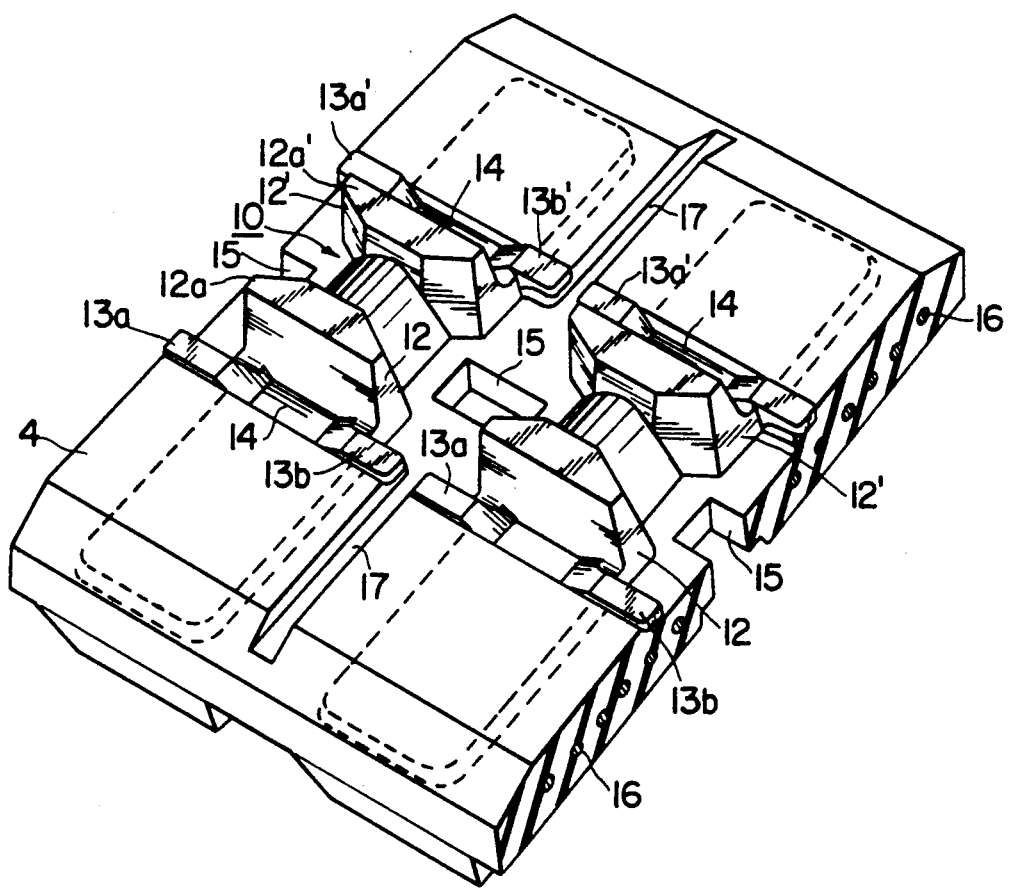
FIG. 4 is a fragmentary, perspective view showing a condition wherein the core bars shown in FIG. 3 are embedded in a rubber belt proper.

Thus, the core bars 10 having the above-mentioned configuration are embedded in a rubber belt 4 in such a way as to partially expose the upper surfaces of the stepped shoulder portions 13a,13b,13a' and 13b' from the inner periphery of the rubber belt as shown in FIG. 4. Further, in FIG. 4, reference numeral 15 denotes a hole adapted to engage with a tooth of a sprocket 8, 16 a steel cord embedded in the rubber belt 4, 17 a groove formed between the adjoining core bars in parallel with the same, and 1 a central connecting portion.

Figure 5A:
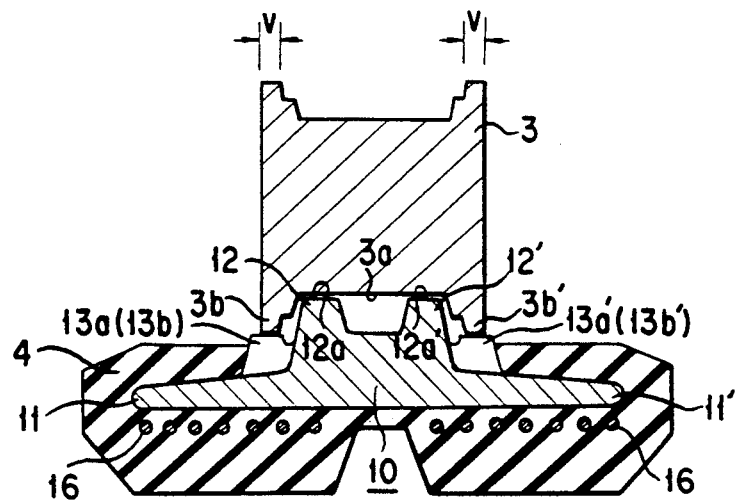
FIGS. 5A, 5B and 5C show conditions wherein bogie wheels are kept in contact with the rubber belt having the core bars embedded therein.
Figure 5B:
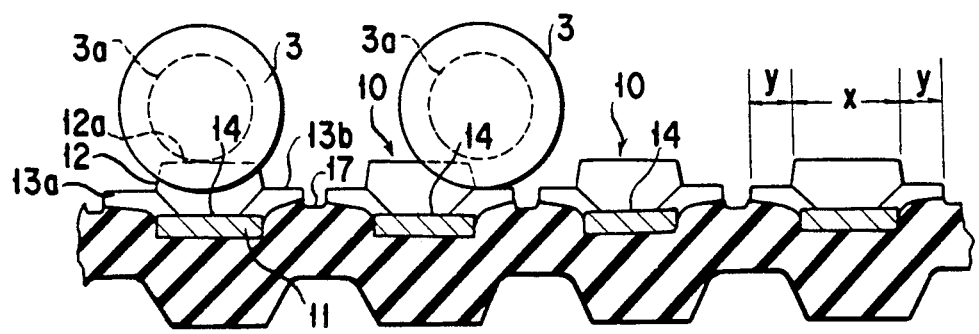
Figure 5C:
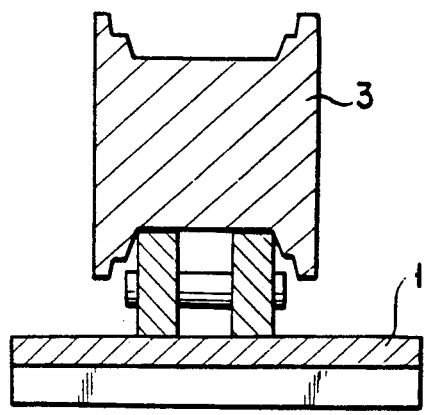

FIGS. 5A, 5B and 5C show conditions of the crawler assembly in use wherein each of bogie wheels 3 is of an outer flange type, and its inner peripheral rolling surface 3a and outer peripheral surfaces of its outer flanges 3b, 3b' are brought into contact in turn with top surfaces 12a and 12a' of the central projections 12 and 12' and the stepped shoulder portions 13a,13b, 13a' and 13b'. Stating more concretely, when the bogie wheel 3 is located on the top surfaces 12a and 12a' of the central projections 12 and 12', the rubber belt 4 runs while the top surfaces 12a and 12a' of the central projections 12 and 12' are being pushed by the inner peripheral surface 3a, while the bogie wheel 3 is not located at such a position, the rubber belt 4 runs while the stepped shoulder portions 13a and 13a' or 13b and 13b' are being pushed by the outer flange portions 3b and 3b'.

In that case, since the extent X of each of the top surfaces 12a, 12a' of the central projections 12, 12' covers the portion of the rubber belt proper having a high rigidity, when the bogie wheel 3 is located on the top surfaces 12a, 12a', it is subjected to a high stress, whilst since the extent y of each of the top surfaces of the stepped shoulder portions 13a,13b' and 13a' and 13b' covers the portion of the belt proper having a rigidity less than that of the extent y, the bogie wheel 3 is subjected to a smaller stress. Therefore, the width V of each of the outer flanges 3b and 3b' which come into contact with the stepped shoudler portions can be set at a comparatively small value.

During the above-mentioned running of the rubber belt, when each of the bogie wheels 3 is located on the top surfaces of the central projections 12 and 12', the outer flanges 3b and 3b' are located in the recesses 14 and 14', respectively, formed between the stepped shoulder portions 13a and 13b and between the stepped shoulder portions 13a' and 13b' in non-contact condition.

FIG. 5C is a sectional view of the iron crawler track in running condition wherein the outer peripheral surface 3a of the central inner wheel portion of the bogie wheel 3 is kept in contact with the shoe link.

SECOND EMBODIMENT

Figure 6:
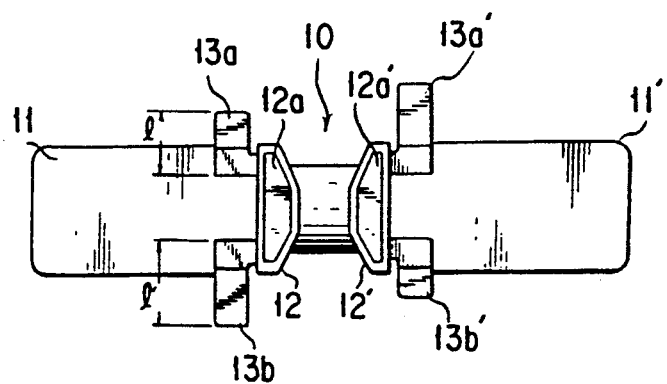
FIGS. 6, 8 and 10 are plan views showing other embodiments of the core bar.
Figure 7:
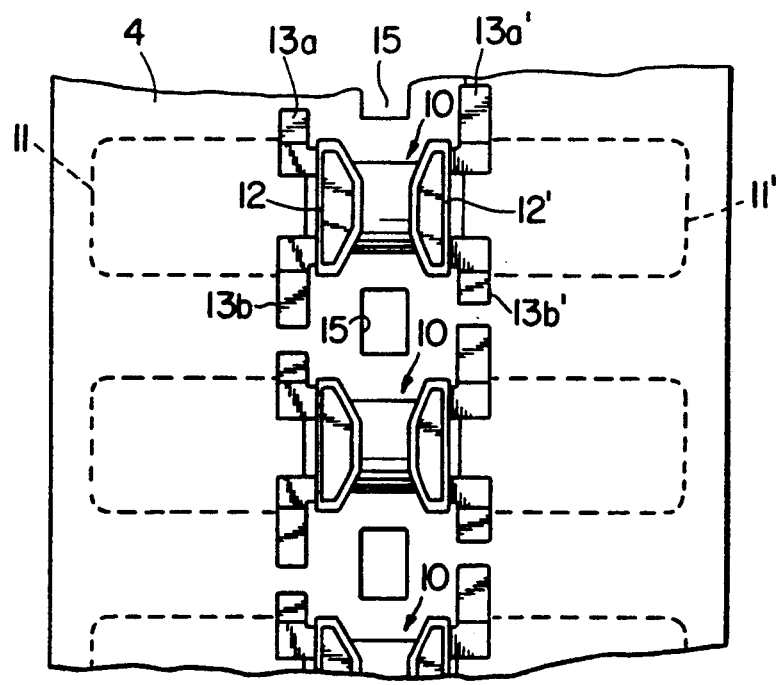
FIGS. 7, 9 and 11 are fragmentary plan views, respectively, showing conditions wherein the core bars as shown in FIGS. 6, 8 and 10, respectively are embedded in the rubber belt propers.

FIG. 6 shows another embodiment of the core bar wherein the length l of the stepped shoulder portion 13a is shorter than the length l' of the stepped shoulder portion 13b, whilst the length of the stepped shoulder portion 13a' is longer than the length of the stepped shoulder portion 13b'; that is; at the left and right positions outside the central projection 12 and 12', the long and short stepped shoulder portions are located in staggered relationship. FIG. 7 is a plan view showing such core bars embedded in a rubber belt proper. In this case, the long stepped shoulder portions 13b and 13a' and the short stepped portions 13a and 13b' are located alternately or in staggered relationship in the lengthwise direction of the core bar.

THIRD EMBODIMENT

Figure 8:
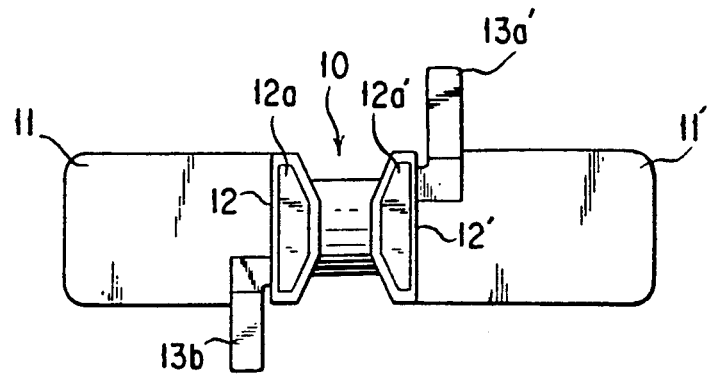
Figure 9:
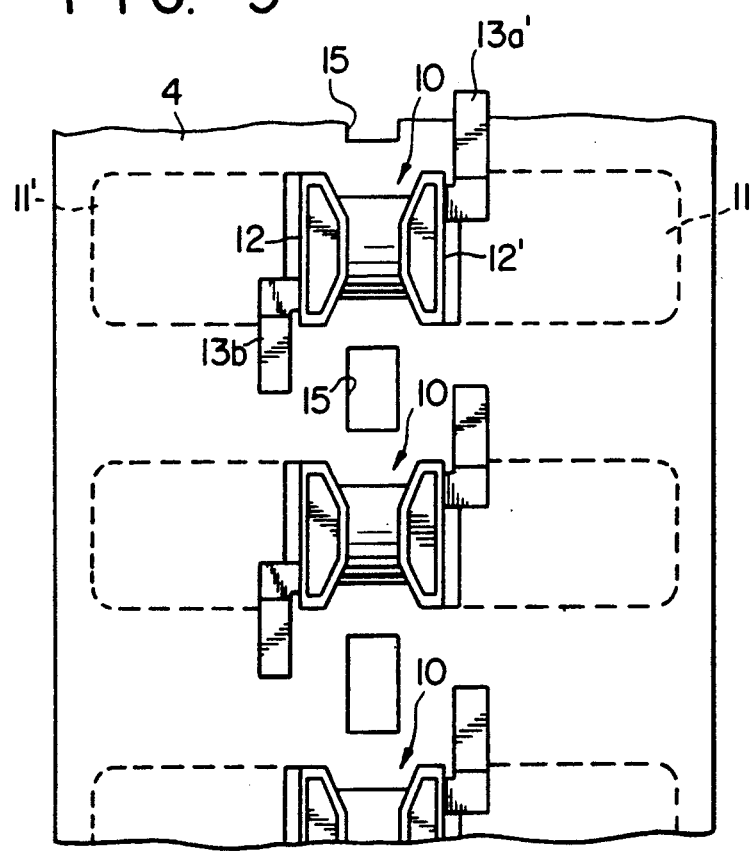

FIG. 8 shows a further embodiment of the core bar wherein the short stepped shoulder portions of the embodiment shown in FIG. 6 are omitted, while FIG. 9 is a plan view showing such core bars embedded in a rubber belt proper.

In this third embodiment, as in the case of the second embodiment, when the core bars 10 are embedded in the rubber belt proper, the distance between the stepped shoulder portions of the adjoining core bars 10, 10 can be reduced wherever practicable.

FOURTH EMBODIMENT

Figure 10:
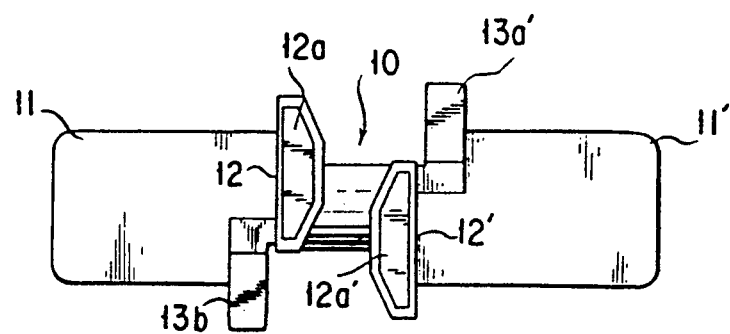
Figure 11:
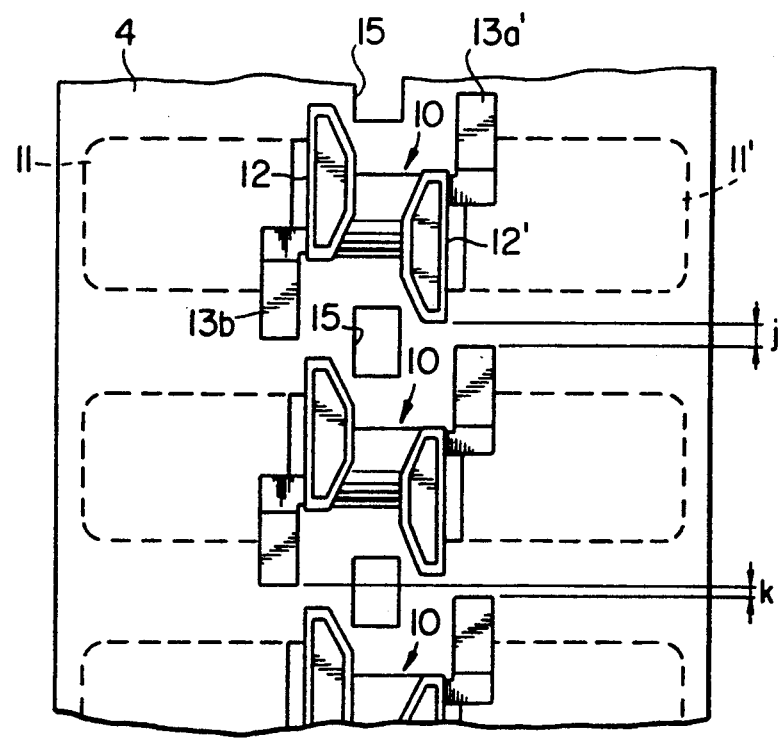

While in the above-mentioned first, second and third embodiments the central projections 12, 12' of the core bars are formed in opposed and parallel relationship in the central portion thereof, in this fourth embodiment the central projection 12 and 12' are located in parallel and staggered or out of phase relationship with each other, as shown in FIG. 10. By such an arrangement, the length of projection of the stepped shoulder portions can be increased as shown in FIG. 11 so that the spacing j between the lengthened stepped shoulder portion of one of the adjacent core bars 10 and the central projection of the other core bar 10 can be reduced, and also the spacing k between the right-hand stepped shoulder portion of one of the adjacent core bars 10 and the left-hand stepped shoulder portion of the other core bar 10 can be reduced (or set to zero) wherever practicable. Thus, vibration of the rubber belt during running can be reduced further.

Since the crawler assembly of the present invention is configured as mentioned above, the bogie wheel can be used for both the iron crawler track and the rubber belt having the core bars embedded therein.

Figure 12A:
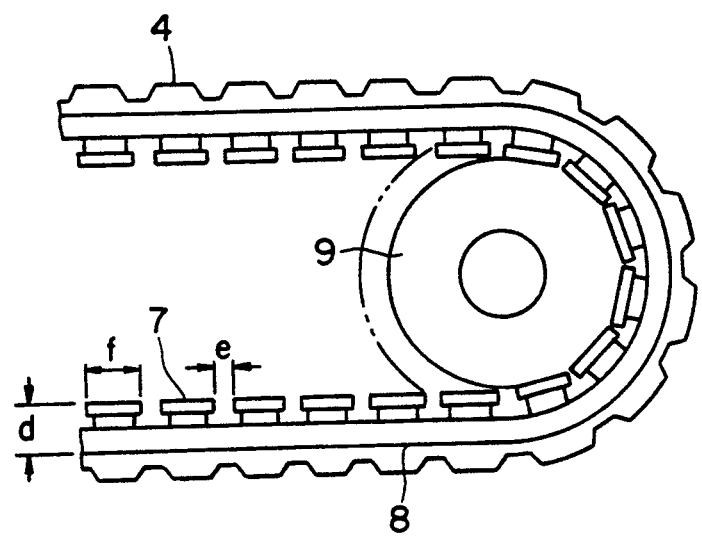
FIGS. 12A and 12B are schematic longitudinal sectional views, respectively, showing a crawler assembly wound round a sprocket portion.
Figure 12B:
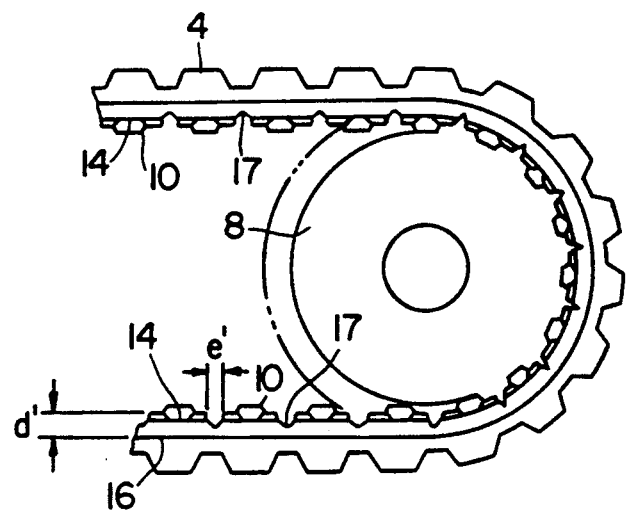

Further, in case the rubber belt having the core bars embedded therein is used, the distance between the surfaces of the core bar which are kept in rolling contact with the bogie wheel; that is, the top surfaces of the stepped shoulder portions 13a,13b, 13a' and 13b' of the core bar and steel cords 16 can be set comparatively smaller that in the case of the prior art example. Therefore, as shown in FIG. 12A (prior art example) and FIG. 12B (the embodiment of the present invention), $d > d'$ and $e > e'$.

Therefore, the occurrence of such a phenomenon as inward bending of the rubber belt when it climbs over obstacles such as stone or the like can be prevented so that vibration of the rubber belt can be reduced thereby improving the stability thereof during running.

Further, the compressibility of the crawler assembly wound round the sprocket can be reduced, and also collision of the adjoining core bars with each other when the crawler assembly is wound round the sprocket can be prevented, so that effective driving power transmission can be achieved. Further, at that time, the groove 17 serves to release the compressive strain which occurs on the inner peripheral surface of the rubber belt proper.

Still further, according to the present invention, since "putting phenomenon" does not occur, the durability of the rubber belt is excellent, and also since the outer flanges of the bogie wheel urge against the stepped shoulder portions, the width V of each of the outer flanges of the bogie wheel (Refer to FIG. 5A) can be reduced.

Figure 13A:
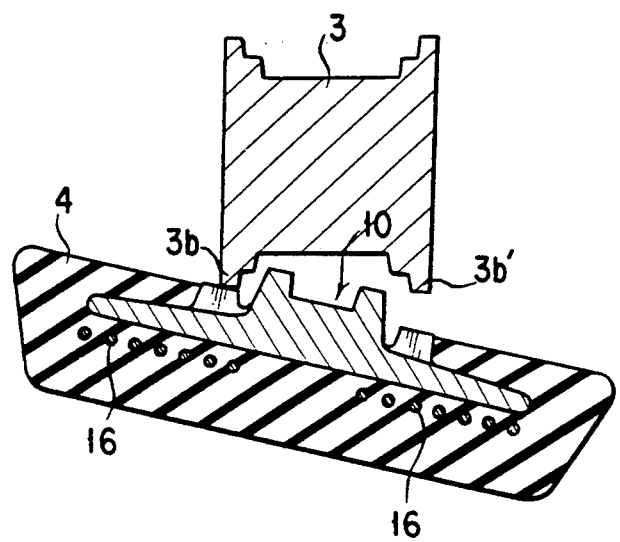
FIGS. 13A and 13B are schematic, transverse sectional views, respectively, showing floating conditions of the bogie wheel in case the rubber belt having the core bars embedded therein is tilted.
Figure 13B:
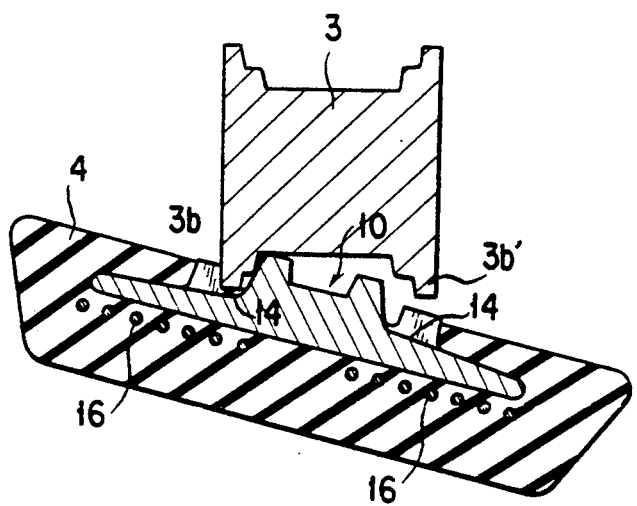

Yet further, according to the present invention, since the recesses 14 and 14' are defined between the stepped shoulder portions of the core bars, as shown in FIGS. 13A (prior art example) and 13B (present invention), the amount of "floating" or rising of the bogie wheel in case the rubber belt having the core bars embedded therein is tilted can be reduced so that the affect of preventing the belt from being detached from the bogie wheel can be enhanced.

Further, in the embodiment of the present invention as shown in FIG. 8, since there is no fear of the core bars colliding with each other in the portions of the crawler assembly wound round the sprocket, the length of the stepped shoulder portions 13b, 13a' can be increased sufficiently, so that the amount of dropping of the bogie wheel between the central projections of the adjoining bars can be reduced further, thereby enhancing the vibration preventing effect conspicuously.

Hereupon, in case the rubber belt having the core bars embedded therein is used, there is a problem that during running of the rubber belt, when the outer flanges 3b (3b') of the outer-flanged bogie wheel 3 are running on the stepped shoulder portions K of the core bar 6, the outer end faces of the central projections P of the core bar which project upwardly in the central zone of the rubber belt proper 4 are brought into contact with the left-hand and right-hand outer flange portions 3b and 3b' of the outer-flanged bogie wheel 3, thus causing severe wear-down of the upper marginal portions S of the outer end faces of the central projections P of the core bar 6.

Such quick wear-down of the upper marginal portions S is due to the fact that the distance $D \rightarrow C (=L)$ of movement of the bogie wheel 3 on the top surfaces of the stepped shoulder portions K is equal to the distance or the circular arc $D \rightarrow C'$ over which the outer peripheries of the outer flange portions (3b, 3b') are brought into contact with the top surfaces of the stepped shoulder portions K, while the difference between the length $F \rightarrow E$ (which is equal to the above-mentioned length L) of the outer, upper marginal portions of the central projections P and the inside distance $F \rightarrow E' (=L')$ of the outer flange portions (3b, 3b') which are brought into contact with the outer, upper marginal portions is large.

As a result, the vibration of the endless track will increase gradually so that the bogie wheels become liable to detach from the rubber belt.

Figure 15:
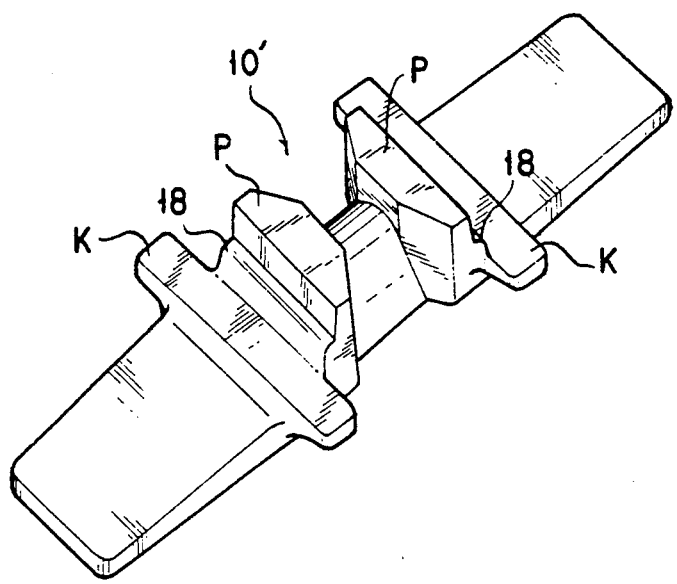
FIGS. 15 and 16 are schematic, perspective views showing further two embodiments of the core bar.
Figure 16:
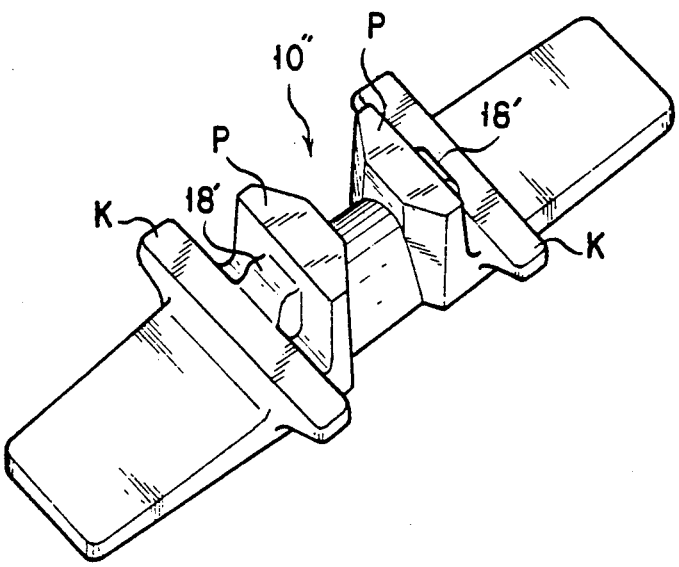

Embodiments of the core bar which have been improved to eliminate the above-mentioned disadvantage are shown in FIGS. 15 and 16.

FIG. 15 is a perspective view of an improved core bar 10' according to the present invention wherein intermediate stepped shoulder portions 18, 18 are formed between the central projections P, P which stand upright in the central zone and stepped shoulder portions K, K on both sides of the core bar.

FIG. 16 is a modification of the embodiment of core bar shown in FIG. 15. While in the embodiment shown in FIG. 15 the intermediate stepped shoulder portions 18, 18 are formed along the whole outer end faces of the central projections P, P, a core bar 10'' in this embodiment has intermediate stepped shoulder portions 18', 18' formed only along the central portions of the outer end surfaces of the central projections P, P.

Figure 17A:
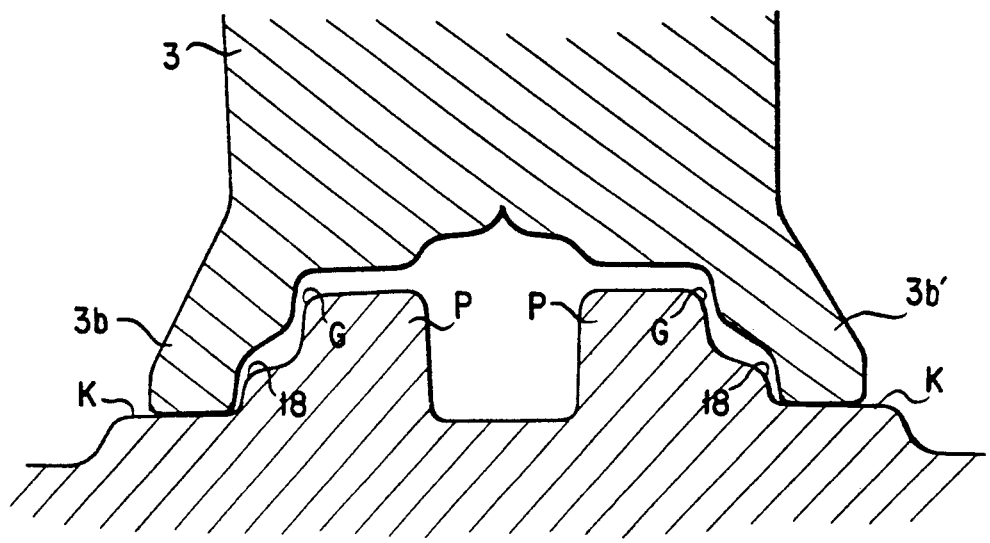
FIG. 17A is a fragmentary, transverse sectional view showing a positional relationship between the core bar and the outer flange bogie wheel in a crawler assembly having the core bars as shown in FIGS. 15 and 16 embedded therein when it is running.
Figure 17B:
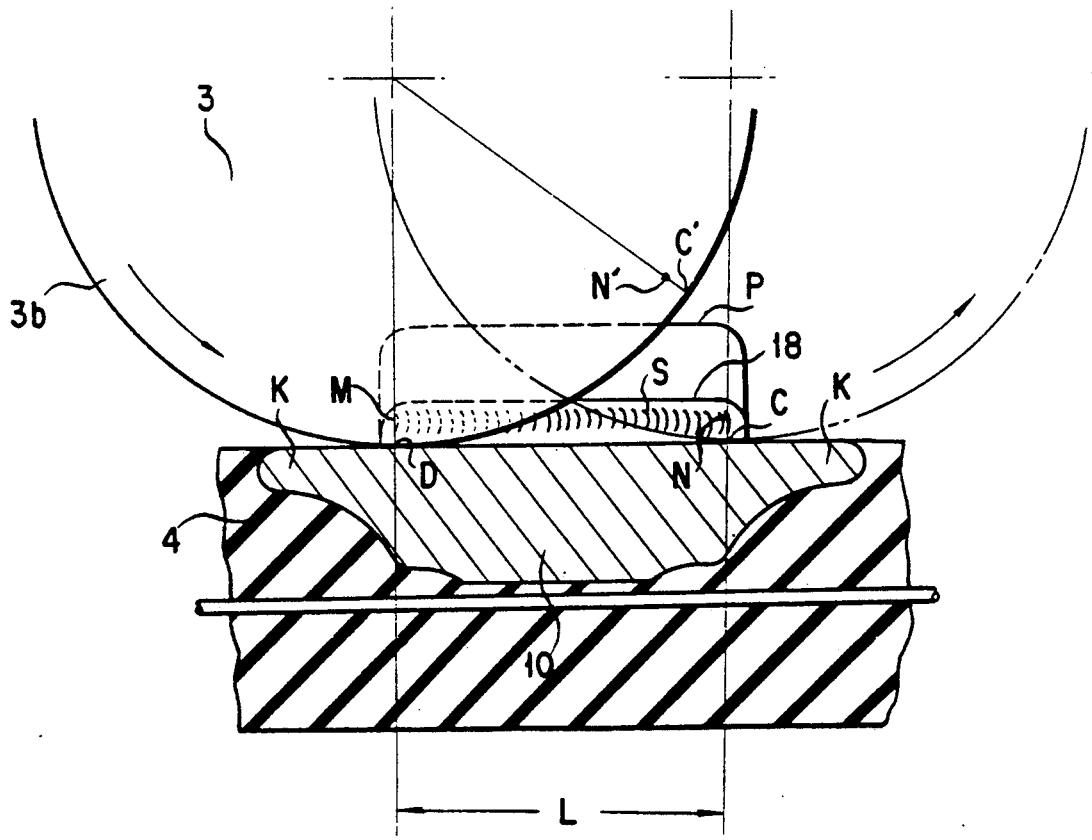
FIG. 17B is an explanatory view showing wear-down condition of the central projection of the core bar in the rubber crawler assembly of the present invention when it is running, looking from the longitudinal direction of the rubber belt.

FIG. 17A is a fragmentary, transverse sectional view showing a condition wherein the rubber belt having the core bars 10' of the above-mentioned configuration embedded therein is located opposite to the outer-flanged bogie wheel 3 when the belt is running, while FIG. 17B is an explanatory view showing such condition in longitudinal section.

In the rubber crawler assemblies having the modified core bars as shown in FIGS. 15 and 16, respectively, embedded therein, when the bogie wheels 3 are rolling, the inner peripheral surfaces of the outer flange portions 3b (3b') are located opposite to the intermediate stepped shoulder portions 18 (18') with an appropriate clearance kept therebetween.

Figure 14:
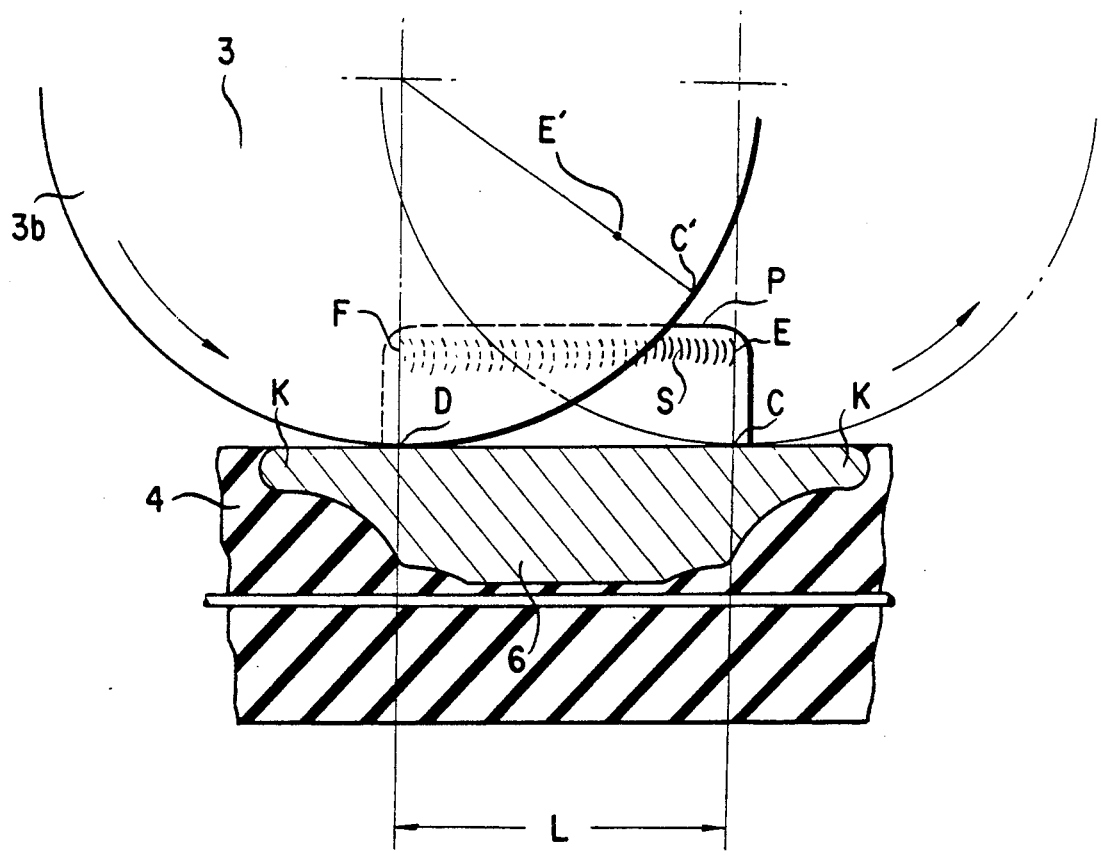
FIG. 14 is an explanatory view showing wear-down condition of the central projection of the core bar in the prior art rubber crawler assembly when it is running, looking from the longitudinal direction of the rubber belt.

Thus, since the intermediate stepped shoulder portions 18 are located at lower positions near the surfaces of the stepped shoulder portions K on which the bogie wheel runs, during running of the crawler assembly, the difference between the length $M - N$ (which is equal to the above-mentioned length L) of the upper marginal portions of the sides of the intermediate stepped shoulder portions 18 and the inside distance $M - N'(L'')$ of the outer flange portions 3b (3b') which are located opposite to the upper marginal portions is limited ($L \approx L'$) as compared with FIG. 14 (prior art example, so that the amount of wear-down of the oppositely located portions can be reduced substantially.

In this case, it is also possible to locate the inner peripheral surfaces of the outer flange portion 3b (3b') opposite to the upper marginal portions G of the central projections P, P in addition to the intermediate stepped shoulder portions 18 (18'). Since the wear-down of the intermediate stepped shoulder portions 18 (18') is reduced, the wear-down of the upper marginal portions G can be reduced in like manner.

Further, it is not always necessary to provide the intermediate stepped shoulder portions 18, and instead widthwise reduced stepped shoulder portions 18', 18' may be provided as shown in FIG. 16 to obtain the same effect.

Figure 18:
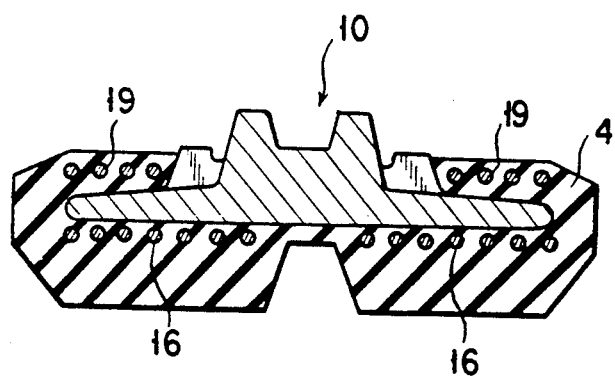
FIG. 18 is a transverse sectional view of a still further embodiment of the rubber belt having the core bars embedded therein according to the present invention.

FIG. 18 shows a still further embodiment of the rubber belt having the core bars embedded therein according to the present invention. According to this embodiment, steel cords 19 are embedded between the upper portion of the rubber belt 4 having the core bars 10 embedded therein; that is, the upper surface of the rubber belt and the left-hand and right-hand wing portions of the core bar 10.

What is claimed is:

1. A crawler assembly comprising: a plurality of outer-flanged bogie wheels each having flange portions formed on both outer sides of a central inner wheel portion thereof so as to project radially, said flange portions having rolling surfaces; and an endless rubber belt having core bar means embedded therein and which is wound around the outside of said outer-flanged bogie wheels, wherein the arrangement is made such that the rolling surfaces of the flange portions of each of said outer-flanged bogie wheels are kept in contact with exposed stepped shoulder portions of said core bar means, and wherein the core bar means of said rubber belt is comprised of a plurality of mutually adjacent core bar members embedded in the rubber belt at predetermined intervals with one another along the peripheral direction of the rubber belt and in such a manner that each of the core bars is partially exposed from the inner periphery of the rubber belt.

2. A crawler assembly as claimed in claim 1, wherein parallel grooves are formed transversely widthwise between said mutually adjacent core bar members in the inner peripheral surface of said rubber belt.

3. A crawler assembly as claimed in claim 1, wherein each of said core bar members comprises a pair of central projections standing upright in opposed relationship with each other on both sides of a central connecting portion, left-hand and right-hand horizontal wing portions projecting integrally from these central projections on the opposite sides of said central connecting portion, and stepped shoulder portions formed in parallel relationship with each other in the boundaries between the left-hand and right-hand horizontal wing portions and said pair of central projections, respectively, the stepped shoulder portions projecting outwardly from the front and rear ends of each of the horizontal wing portions, said stepped shoulder portions each having a substantially flat surface somewhat higher in level than the upper surface of each of said left-hand and right-hand horizontal wing portions.

4. A crawler assembly as claimed in claim 3, wherein each pair of stepped shoulder portions of said core bar member have a recess formed in the intermediate portion thereof and having a predetermined length.

5. A crawler assembly as claimed in claim 4, wherein the lengths of the upper surfaces of the front and rear stepped shoulder portions having said intermediate recess formed therebetween are different, and the arrangement of the upper surfaces of the front and rear stepped shoulder portions on the side of the left-hand horizontal wing portion is reverse to that of the upper surfaces of the front and rear stepped shoulder portions on the side of the right-hand horizontal wing portion.

6. A crawler assembly as claimed in claim 5, wherein the front stepped shoulder portion on the side of said left-hand horizontal wing portion and the rear stepped shoulder portion on the side of said right-hand horizontal wing portion are omitted.

7. A crawler assembly as claimed in claim 3, wherein the pair of central projections of said core bar member are formed out of phase in front and rear about the central point of the core bar member, creating a biased side of each of said central projections, and also said stepped shoulder portions are formed only on either one of the front or rear side reverse to the biased side of each of the central projections.

8. A crawler assembly as claimed in claim 3, wherein an intermediate stepped shoulder portion is formed integrally with the lower portion of the end face of each of said pair of central projections on the side of each of said stepped shoulder portions, each of the intermediate stepped shoulder portions having a height which is intermediate between the height of the top surface of each of the central projections and that of the upper surface of each of said stepped shoulder portions, the skirt portion of each of the intermediate stepped shoulder portions joining the upper surface of each of said stepped shoulder portions.

9. A crawler assembly as claimed in claim 8, wherein each of said intermediate stepped shoulder portions is formed partially in the central zone of the end face of each of said central projections.

10. A crawler assembly as claimed in claim 1, wherein it further comprises steel cords embedded between the upper surface of said rubber belt and said core bar means.

11. A crawler assembly as claimed in claim 5, wherein the rear stepped shoulder portion on the side of said left-hand horizontal wing portion and the front stepped shoulder portions on the side of said right-hand horizontal wing portion are omitted.

* * * * *